(12) United States Patent
Kurple et al.

(10) Patent No.: US 11,434,331 B2
(45) Date of Patent: Sep. 6, 2022

(54) LIGNIN HYBRID POLYMERS OBTAINED FROM THE REACTION OF LIGNIN AND COMPATIBLE POLYMER PRECURSORS, AND STARTING COMPOSITIONS FOR FORMING LIGNIN HYBRID POLYMERS

(71) Applicant: Organic Chemical, LLC, Ypsilaniti, MI (US)

(72) Inventors: Kurt Kurple, China, MI (US); Nathan Kurple, Willis, MI (US); Michael Kerman, Romeo, MI (US)

(73) Assignee: Organic Chemical, LLC, Ypsilanti, MI (US)

( * ) Notice: Subject to any disclaimer, the term of this patent is extended or adjusted under 35 U.S.C. 154(b) by 187 days.

(21) Appl. No.: 16/668,801

(22) Filed: Oct. 30, 2019

(65) Prior Publication Data

US 2020/0140624 A1    May 7, 2020

Related U.S. Application Data

(60) Provisional application No. 62/753,968, filed on Nov. 1, 2018.

(51) Int. Cl.
*C08H 6/00* (2010.01)
*C08H 7/00* (2011.01)

(52) U.S. Cl.
CPC .................... *C08H 6/00* (2013.01)

(58) Field of Classification Search
None
See application file for complete search history.

(56) References Cited

U.S. PATENT DOCUMENTS

| | | | | |
|---|---|---|---|---|
| 2,669,522 A | * | 2/1954 | Othmer | C08L 2666/26 106/164.01 |
| 4,803,255 A | | 2/1989 | Pruett et al. | |
| 5,596,032 A | * | 1/1997 | Schilling | C08L 95/005 524/60 |
| 9,593,221 B1 | * | 3/2017 | Kurple | C08G 18/7664 |
| 2011/0098384 A1 | | 4/2011 | Blount | |
| 2015/0126716 A1 | | 5/2015 | Kessler et al. | |
| 2016/0208044 A1 | * | 7/2016 | Mukerjee | C08J 11/24 |
| 2016/0222151 A1 | | 8/2016 | Chung | |
| 2017/0002138 A1 | * | 1/2017 | Mukerjee | C08G 18/664 |
| 2017/0096519 A1 | | 4/2017 | Kurple | |
| 2019/0292303 A1 | * | 9/2019 | Luo | C08G 18/6492 |
| 2020/0140624 A1 | * | 5/2020 | Kurple | C08L 97/005 |

FOREIGN PATENT DOCUMENTS

WO   WO-2017127224 A1 * 7/2017 ......... C08G 18/7671

OTHER PUBLICATIONS

PCT/US2019/059007 International Preliminary Report on Patentability dated Apr. 20, 2020.

* cited by examiner

*Primary Examiner* — Peter A Salamon
(74) *Attorney, Agent, or Firm* — O'Connor & Company; Ryan P. O'Connor

(57) ABSTRACT

The disclosed invention provides starting compositions for making lignin hybrid polymers, reactions of lignin and polymer precursors to manufacture lignin hybrid polymers, and final lignin hybrid polymers produced. The most important process requirement is the compatibility of lignin and polymer precursors. Lignin and the polymer precursors must be compatible to assure that the lignin and polymers precursors react and produce a lignin hybrid polymer with useful properties. The lignin hybrid polymers can be in the form of a polyol, a thermoplastic resin, or a thermoset resin. The lignin hybrid polyol, thermoplastic resin, or thermoset resin can be used in a wide range of products including, but not limited to, coatings, adhesives, sealants, elastomers, binders, thermoset resins, thermoplastic resins, and polyurethane systems.

13 Claims, No Drawings

LIGNIN HYBRID POLYMERS OBTAINED FROM THE REACTION OF LIGNIN AND COMPATIBLE POLYMER PRECURSORS, AND STARTING COMPOSITIONS FOR FORMING LIGNIN HYBRID POLYMERS

PRIORITY DATA

This patent application is a non-provisional application claiming priority to U.S. Provisional Patent App. No. 62/753,968, filed on Nov. 1, 2018, which is hereby incorporated by reference herein.

FIELD OF THE INVENTION

The present invention generally relates lignin-containing polymers, precursor compositions for forming lignin-containing polymers, and methods of making lignin-containing polymers from the disclosed precursor compositions.

BACKGROUND OF THE INVENTION

Lignin is the one of the most abundant biopolymers on the planet. Lignin is one component of vascular plant tissue. Cellulose and hemicellulose are the two other components of vascular tissue. In addition, lignin is a waste byproduct of the pulp and paper industry. The waste stream of the pulp and paper industry contains lignin, sugars, organic acids, and inorganic components. Lignin and the other components in waste stream are primarily burned to recover heat value and inorganic components. Over 70 million tons of lignin are burned throughout the world annually. Lignin extracted from waste streams can be used to meet the various applications of the plastics industry without the cost or environmental concerns associated with plastics produced from petroleum or food supply.

Lignin is a biopolymer composed of three phenylpropanoid monomers—p-coumaryl alcohol, coniferyl alcohol, and sinapyl alcohol. In lignin, these monomers form high-molecular-weight and highly branched three-dimensional molecules. The type of biomass will determine the prevalence of the each monomer. Also, the lignin extraction process from biomass will affect its structure and functional groups.

Despite the abundance of lignin, there is a lack of adoption of lignin as a chemical feedstock for polyol and thermoplastics, due to the inherent properties of lignin. Lignin after being extracted from the black liquor waste stream has a three-dimensional structure with a high molecular weight and many different functional groups. The combined effects of high molecular weight and many different functional groups cause lignin to be incompatible with many potential copolymers and processing methods.

In view of the aforementioned limitations in the lignin art, what are needed are new methods, compositions, and principles that enable predictable formation of lignin hybrid polymers from lignin and polymer precursors.

SUMMARY OF THE INVENTION

The present invention addresses the aforementioned needs in the art, as will now be summarized and then further described in detail below.

Some variations provide a composition comprising from about 1 wt % to about 99 wt % of lignin and from about 1 wt % to about 99 wt % of a lignin-compatible blend of at least two distinct polymer precursors, wherein at least one of the polymer precursors has a chemical bond with the lignin.

In some embodiments, the composition consists essentially of the lignin and the lignin-compatible blend of at least two distinct polymer precursors.

The lignin may be derived from fractionating lignocellulosic biomass, such as woody plants (including hardwoods and softwoods), straw, bagasse, corn stover, etc.

In some embodiments, the chemical bond is selected from the group consisting of ester, ether, amide, imide, acetal, ketal, urethane, carbamate, and combinations thereof.

In some embodiments, the lignin-compatible blend of polymer precursors forms a single phase with the lignin.

In some preferred embodiments, the lignin-compatible blend of polymer precursors and lignin are compatible based on analysis using Hansen's Solubility Parameters.

In some embodiments, the lignin is individually compatible with the polymer precursor with a chemical bond with the lignin, based on analysis using Hansen's Solubility Parameters. In other embodiments, the lignin is not individually compatible with the polymer precursor with a chemical bond with the lignin, based on analysis using Hansen's Solubility Parameters In some embodiments, the lignin is individually compatible with all polymer precursors present in the composition, based on analysis using Hansen's Solubility Parameters. In other embodiments, the lignin is not individually compatible with one or more polymer precursors present in the composition, based on analysis using Hansen's Solubility Parameters. In certain embodiments, the lignin is not individually compatible with any of the polymer precursors present in the composition, based on analysis using Hansen's Solubility Parameters.

In some embodiments, the polymer precursors are compatible with each other, based on analysis using Hansen's Solubility Parameters. In other embodiments, the polymer precursors are not compatible with each other, based on analysis using Hansen's Solubility Parameters. When there are three or more polymer precursors, two of them may be incompatible with each other while a third polymer precursor is compatible with one or two of the other polymer precursors, for example.

In some embodiments, the polymer precursors are selected from the group consisting of alcohols, aldehydes, amines, anhydrides, carboxylic acids, halocarbons, hydroxy acids, amino acids, amino alcohols, and combinations thereof.

In various embodiments, the alcohols are selected from the group consisting of methanol, ethanol, propanol, and isopropanol, allyl alcohol, geraniol, and propargyl alcohol, 1,2-ethandiol, 1,2-propandiol, 1,3-propandiol, 1,4-butandiol, 1,5-pentandiol, 1,6-hexandiol, 1, 7-heptandiol, 1,8-octandiol, 1,9-nonandiol, 1,10-decandiol, 1,11-undecandiol, 1,12-dodecandiol, 1,13-tridecandiol, 2-methyl-1,3-propanediol, 2,2,4,4-tetramethyl-1,3-cyclobutanediol, 2,2,4,4-tetramethyl-1,3-cyclobutanediol, 3-methyl-1,5-pentanediol, 1,3-cyclohexanediyldimethanol, cyclohexanedimethanol, ethylene glycol, propylene glycol, 1,2-butylene glycol, 1,3-butylene glycol, neopentyl glycol, propylene glycol, dipropylene glycol, tripropylene glycol, triethylene glycol, tetraethylene glycol, phenol, bisphenol A, ethoxylates, glycerol, pentaerythritol, sorbitol, trimethylolpropane, and combinations thereof.

In various embodiments, the aldehydes are selected from the group consisting of formaldehyde (including paraformaldehyde), acetaldehyde (including paraacetaldehyde), propionaldehyde, butyl aldehyde, amyl aldehyde, hexyl aldehyde, and heptyl aldehyde, cyclohexyl aldehyde, furfural, benzaldehyde, 2-methyl benzaldehyde, 3-methyl benzaldehyde, 4-methyl benzaldehyde, p-hydroxy benzaldehyde, m-hydroxy benzaldehyde, phenyl acetaldehyde, and phenyl propionaldehyde, glutaraldehyde glyoxal, malondialdehyde, succindialdehyde, glutardialdehyde, adipindialdehyde, terephthaldialdehyde, and combinations thereof.

In various embodiments, the amines are selected from the group consisting of methylamine, ethylamine, propylamine, butylamine, hexylamine, octylamine, decylamine, stearylamine, dimethylamine, diethylamine, dipropylamine, dibutylamine, cyclohexylamine, dicyclohexylamine, aniline, toluidine, diphenylamine, naphthylamine, aliphatic 1,2-ethylenediamine, 1,3-trimethylenediamine, 1,4-tetramethylenediamine, 5-pentamethylenediamine, 2-methyl-1,5-pentamethylenediamine, 1,6-hexamethylenediamine, 1,7-heptamethylenediamine, 1,8-octamethylenediamine, 1,9-nonamethylenediamine, 2-methyl-1,8-octamethylenediamine, 1,10-decamethylenediamine, 1,11-undecamethylenediamine, 1,12-dodecamethylenediamine, 1,13-tridecamethylenediamine, 1,16-hexadecamethylenediamine, 1,18-octadecamethylene-diamine or 2,2,4(or 2,4,4)-trimethylhexamethylenediamine, piperazine, cyclohexanediamine, bis(3-methyl-4-aminohexyl)methane, bis(4,4'-amino-cyclohexyl)methane, isophoronediamine, m-xylylenediamine, p-xylylenediamine, p-phenylenediamine, m-phenylenediamine, and combinations thereof.

In various embodiments, the anhydrides are selected from the group consisting of acetic anhydride, propanoic anhydride, butanoic anhydride, hexanoic anhydride, pyromellitic dianhydride, oxydiphtalic dianhydride, benzophenone tetracarboxylic dianhydride, diphthalic anhydride, benzoquinonetetracarboxylic dianhydride, ethylenetetracarboxylic dianhydride, maleic anhydride, cyclohexanedioic anhydride, butylbenzoic anhydride, phthalic anhydride, terephthalic anhydride, isophthalic anhydride, trimellitic anhydride, naphthalenetetracarboxylic dianhydride, pyromellitic dianhydride, and combinations of thereof.

In various embodiments, the carboxylic acids are selected from the group consisting of acetic acid, propanoic acid, butanoic acid, hexanoic acid, oleic acid, linoleic acid, nonanoic acid, undecanoic acid, lauric acid, isononanoic acid, adipic acid, azelaic acid, sebacic acid, succinic acid, glutaric acid, decanoic diacid, dodecanoic diacid, cyclohexanedioic acid, cyclohexane carboxylic acid, tricyclodecane carboxylic acid, camphoric acid, benzoic acid, t-butylbenzoic acid, phthalic acid, terephthalic acid, isophthalic acid, trimellitic acid, naphthalene dicarboxylic acids, pyromellitic acid, 2,5-furandicarboxylic acid, citric acid, aconitic acid, isocitric acid, sorbic acid, and combinations of thereof.

In various embodiments, the halocarbons are selected from the group consisting of organofluorine compounds, organochlorine compounds, organobromine compounds, organoiodine compounds, and combinations thereof.

In various embodiments, the hydroxy acids are selected from the group consisting of lactic acid, glycolic acid, butyric acid, valeric acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, salicyclic acid, and combinations thereof.

In various embodiments, the amino acids are selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, selenocysteine, pyrrolysine, and combinations thereof.

In various embodiments, the amino alcohols are selected from the group consisting of methanolamine, ethanolamine, aminomethyl propanol, diglycolamine, diethanolamine, diisopropanolamine, methyldiethanolamine, heptaminol, n-methylethanolamine, isoetarine, phenylpropanolamine, sphingosine, and combinations thereof.

Some variations of the invention provide a lignin hybrid polymer produced by polymerizing, crosslinking, curing, or otherwise reacting a disclosed composition, wherein the lignin hybrid polymer contains the lignin and a reacted variant of the polymer precursors.

DETAILED DESCRIPTION OF EMBODIMENTS OF THE INVENTION

The materials, structures, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention.

As used in this specification and the appended claims, the singular forms "a," "an," and "the" include plural referents unless the context clearly indicates otherwise. For example, within each embodiment, the singular and plural forms of the material, polymer precursor, glycol, alcohol, amine, carboxylic acid, etc. encompass both singular and plural.

Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The disclosed invention, in some variations, provides lignin hybrid polymers produced from a reaction of lignin and compatible polymer precursors. The process for manufacturing lignin hybrid polymers and applications of lignin hybrid polymers are also disclosed herein. The embodiments of lignin hybrid polymers are virtually infinite. This disclosure includes the essential properties of the composition of the lignin hybrid polymer, properties of lignin, properties of the polymer precursors, and reaction processes.

The term "lignin" refers to a polymer or oligomer composed of the lignin monomers p-coumaryl alcohol, coniferyl alcohol, and sinapyl alcohol. The molecular weight lignin may vary widely, such as from about 500 to about 50,000 g/mol. The biomass from which lignin is extracted may include any vascular plant including, but not limited to, woody plants (including hardwoods and softwoods), straw, bagasse, corn stover, etc., as well as lignin-containing biomass residues from industrial operations. The technique used to extract lignin from the biomass may include solvent pulping, sulfite pulping, soda pulping, alkali pulping, semi-mechanical pulping, steam explosion, enzymatic pulping processes, and recovery from distillation bottoms of a process fermenting lignocellulosic biomass-derived sugars to ethanol or another product, for example. Mixtures of lignin from different biomass sources and extraction processes may be used as well.

The term "lignin hybrid polymer" refers to a polymer comprising a chain of bonded lignin and polymer precursors that are reacted together, with lignin, or both of these. The bonds between lignin and polymer precursors form the backbone of the lignin hybrid polymer. These bonds may include, but are not limited to, esters, ethers, amides, imides, acetals, ketals, urethanes, carbamate, epoxies, phenolics, carbonates, etc.

The term "polymer precursor" is used herein to refer to a compound which can undergo polymerization to form polymers. Polymer precursors may include both monomers and oligomers (e.g., dimers, trimers, tetramers, and/or pentamers). In some embodiments, polymer precursors are strictly monomers. In some embodiments, one polymer precursor is a monomer and one or more polymer precursors is an oligomer. In some embodiments, one polymer precursor is an oligomer and one or more polymer precursors is a monomer. A polymer precursor with a chemical bond to lignin may be a monomer or an oligomer. Suitable polymer precursors include, but are not limited to alcohols, aldehydes, amines, anhydrides, carboxylic acids, halocarbons, hydroxy acids, amino acids, amino alcohols, or combinations thereof. Polymer precursors can have a range of moieties.

A "lignin hybrid polymer precursor composition" means a precursor composition capable of reacting to form a lignin hybrid polymer. Lignin is generally itself already a polymer or oligomer. The lignin hybrid polymer precursor composition is capable of forming a polymer via polymerization, crosslinking, curing, or other chemistry. The lignin is "hybridized" with at least two polymer precursors where at least one of them is chemically bonded to the lignin. A "lignin-compatible blend of polymer precursors" means a mixture of at least two polymer precursors, wherein the mixture is compatible with lignin, as taught in detail below.

Lignin hybrid polymers have many advantages. First, lignin hybrid polymers contain a significant portion of renewable content, since lignin is a bio-based renewable polymer. As more lignin is used, less petroleum-based materials are needed. Furthermore, if polymer precursors are made from renewable material, then the resulting lignin hybrid polymer can potentially be made from 100% renewable materials. Second, a lignin hybrid polymer requires less energy to manufacture than a similar molecular-weight polymer made entirely from polymer precursors. The reaction of polymer precursors requires a significant amount of energy. Lignin is already a large polymer. As more lignin is used, less energy is needed for the reaction of polymer precursors. Third, lignin imparts many favorable properties to a lignin hybrid polymer. The aromatic structure of lignin will generally give the resulting hybrid polymer mechanical strength, chemical resistance, fire resistance, thermal resistance, and water resistance.

A process to manufacture lignin hybrid polymers requires two conditions. First, polymer precursors must be used which are compatible with lignin, either individually or as a mixture. Second, polymer precursors must be reacted with lignin under the correct processing conditions. When both essential conditions are correctly implemented, the reaction will result in a useful lignin hybrid polymer. The lignin hybrid polymer can be in the form of a polyol, a thermoplastic resin, or a thermoset resin. The lignin hybrid polymer may be used in coatings, adhesives, sealants, elastomers, binders, thermoset resins, thermoplastic resins, and polyurethane systems, for example.

The functional groups on lignin typically form dimers or higher oligomers with each other. The lignin dimerization or oligomerization renders the lignin molecule unreactive with most materials. Chemically compatible materials are necessary to disassociate dimers or oligomers and expose the functional, reactive groups of lignin. The exposed functional groups will be able to react with other materials and allow lignin hybrid polymers to form.

Generally, chemically compatible materials and lignin form a single phase prior to, during, and after a reaction. If the materials are incompatible, then two phases will form either before the reaction, during the reaction, or after the reaction. In most cases, lignin and another material will not form a single phase without blending with heat. A single phase is deemed to be present when a 100-micron film of blended lignin and another material is clear or translucent without any opacity or visible grains, particles, or conglomerations on a length scale (e.g., 1 micron or greater) that causes significant light scattering.

In some embodiments, the lignin and polymer precursors are deemed compatible but form multiple phases prior to reaction, and convert to a single phase during or following reaction (e.g., with time and temperature). In other embodiments, the lignin and polymer precursors are deemed compatible and form a single phase initially, but a small amount of a second phase may form during or following reaction. In preferred embodiments, there is a single phase before, during, and after reaction of the lignin and polymer precursors to form a final polymer.

Chemically compatible materials can be determined experimentally. In some embodiments, the process includes blending lignin and various materials with heat if needed, and evaluating the film of the blend. Experimentally determining chemical compatibility of lignin and other materials is, however, a time-consuming process. Also, experimentally determined chemical compatibility may not predict compatibility during or after a reaction. It is not uncommon for a material to show compatibility after blending and then shown incompatibility either during or after reaction. For example, lignin and copolymers may form a single-phase lignin polyol, and then when the lignin polyol is reacted with isocyanate, two phases may form, resulting in a polyurethane of poor quality.

An analysis utilizing Hansen Solubility Parameters (HSP) provides a quantitative model for chemical compatibility of materials based on the thermodynamic properties of solutions. Hansen Solubility Parameters can be used to predict compatibility of materials without experimentally evaluating each combination of materials. Hansen Solubility Parameters quantify compatibility with three solubility parameters: dispersion forces (denoted as ED), polar forces (denoted as $\delta P$), and hydrogen bonding forces (denoted as $\delta H$). The solubility parameter $\delta D$ quantifies the intermolecular attraction of dispersive or Van der Waals forces. The solubility parameter $\delta P$ quantifies the intermolecular attraction of electrical attraction from dipole moments. The solubility parameter $\delta H$ quantifies the intermolecular attraction due to electron exchange of hydrogen bonding. The SI units of the HSP parameters are $MPa^{1/2}$.

Analysis using Hansen's Solubility Parameters may utilize the principles taught in Charles M. Hansen, *Hansen Solubility Parameters: A User's Handbook,* 2nd Edition, CRC Press LLC (2000), ISBN 0-8493-7248-8, which is hereby incorporated by reference in its entirety.

The compatibility of two materials can be determined by the difference or distance (denoted as Ra) between the two materials, where Ra is calculated by the following equation (EQ. 1):

$$Ra^2 = 4(\delta D_1 - \delta D_2)^2 + (\delta P_1 - \delta P_2)^2 + (\delta H_1 - \delta H_2)^2$$

where $\delta D_1$, $\delta P_1$, and $\delta H_1$ are the solubility parameters for material 1 and $\delta D_2$, $\delta P_2$, and $\delta H_2$ are the solubility parameters for material 2. The smaller the value of Ra, the more likely the two materials (1 and 2) are compatible. In the extreme, Ra=0 and the two materials are highly compatible and will form a single phase. In various embodiments, the Ra between lignin as material 1 and a lignin-compatible blend of polymer precursors, collectively as material 2, may be about, or at most about, 0.05, 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, or 10.

The HSP of any material can be measured or estimated using different methods. HSP can be measured using inverse gas chromatography. The HSP can be estimated using the Y-MB tool of the Hansen Solubility Parameters in Practice ("HSPiP") software. The Y-MB tool will calculate HSP based on the structure of a material in SMILES format. The Y-MB tool can be used to calculate HSP of materials with a known chemical structure with a relatively low molecular weight. The Sphere Technique, which can be performed on any material, consists of measuring the HSP based on the compatibility scores of a material with at least 15 known solvents. Compatibility is defined as the material forming a single phase with a solvent. A compatibility score of "0" means a single phase was not formed. A compatibility score of "1" means a single phase did form. The HSP values can be calculated using the formula described in *Hansen Solubility Parameters: A User's Handbook* or by entering the scores into HSPiP software. Being that lignin has a high molecular weight with an unknown exact structure, the Sphere Technique was used to calculate lignin HSP values.

In addition to providing the HSP, the Sphere Technique will also measure an Rm value for a given material. The Rm value quantifies the maximum distance (Ra) allowing compatibility—the larger an Rm value, the greater the compatibility with other materials, generally speaking. The Rm values of two materials can be used to predict the compatibility of two materials with each other. Each material will have its own Rm value, i.e., $Rm_1$ and $Rm_2$, while there is a single Ra value defined by EQ. 1. If the Ra between two materials is less than $Rm_1$ or $Rm_2$, then the two materials are most likely compatible. If the Ra is greater than ($Rm_1$+$Rm_2$), then the two materials are most likely not compatible. Comparing the Rm and Ra values can predict compatibility without performing experimental compatibility tests.

The HSP and Rm values can be used to create a compatibility sphere which is useful for visualizing the compatibility of materials. The HSP parameters $\delta D$, $\delta P$, and $\delta H$ create the axes of a three dimensional space. The HSP values are the coordinates of a material within the space. The Rm value creates a sphere around the HSP values. Materials whose coordinates are within the sphere will most likely be compatible (Ra<Rm). Materials whose coordinates are outside of the sphere will most likely not be compatible (Ra>Rm), but could be compatible under specific concentrations. The specific concentrations can be determined by plotting the spheres of both materials in the HSPiP software. The area where the spheres overlap—Ra>$Rm_1$ and Ra>$Rm_2$ and Ra< ($Rm_1$+$Rm_2$)—indicates concentrations of the materials where the two materials will be compatible.

The HSP and Rm values of several different lignins were measured using the Sphere Techniques and HSPiP software. The measurement results are shown in Table 1.

TABLE 1

Hansen Solubility Parameters and Rm Values for Different Lignins.

| Lignin Name | Pulping Process | $\delta D$ | $\delta P$ | $\delta H$ | Rm |
|---|---|---|---|---|---|
| Alcell ® | Organosolv | 15.2 | 9.25 | 9.34 | 4.6 |
| BioChoice ® | Kraft | 16.29 | 12.28 | 18.84 | 0.7 |
| Indulin AT | Kraft | 16.59 | 9.07 | 15.58 | 1.9 |

It is well known in the art that organosolv lignin is more compatible with conventional polyols than is Kraft lignin. The HSP values of Alcell confirm the experimental observation of greater compatibility of organosolv lignin. Alcell lignin HSP values are closer to the HSP values of conventional polyols than either Indulin AT lignin or BioChoice lignin. In addition, Alcell lignin has the lowest $\delta H$ value which indicates Alcell will have less lignin dimers than BioChoice lignin or Indulin AT lignin.

In additional to providing the chemical compatibility of individual materials, HSP can also calculate the chemical compatibility of one material with a mixture (blend) of other materials. A mixture of materials is very beneficial for the manufacture of lignin hybrid polymers. A lignin hybrid polymer with useful properties typically requires mixture and reaction of lignin with several different (chemically distinct) polymer precursors, in the form of a lignin-compatible blend, as taught in this specification. The parameters $\delta D$, $\delta P$, and $\delta H$ of a mixture of materials can be calculated as the mass-weighted average of the individual-species $\delta D$, $\delta P$, and $\delta H$ parameters, i.e., for each parameter, the sum of the parameter of each component multiplied by mass percentage of that component. Notably, the mixture may include materials which individually may or may not be compatible with lignin; however, a mixture containing one or more individually incompatible polymer precursors at the correct ratios may itself (as a blend) be compatible with lignin. The HSP of a mixture is very helpful in predicting compatibility with lignin and producing lignin hybrid polymers with useful properties.

Lignin hybrid polymers can be made with a wide range of properties. The properties are affected by many factors such as the properties of the lignin, properties of the polymer precursors, the stoichiometric ratios of lignin and polymer precursors, the reaction steps, and reaction conditions. If one of the factors is sub-optimal, then the resulting lignin hybrid polymer may have undesirable properties.

The properties of lignin are affected by the type of biomass and the extraction process from biomass. Hardwood lignin will tend to have greater methoxy content than softwood lignin. Generally, lignin extracted using an organosolv method will have less ash content and will have a higher degree of hydrophobicity than lignin extracted using other methods. Lignin from a sulfite process will tend to have the highest molecular weight and ash content. Lignin from a Kraft process will have the highest amount of benzylic carboxyl groups.

Similarly, the properties of polymer precursors will affect the properties of lignin hybrid polymers. Polymer precursors which form polyesters or polyamides will have increased strength and melting point due to hydrogen bonds between adjacent polymer chains. Polymer precursors which form polyester lignin hybrid polymers will be susceptible to hydrolytic degradation—as the ester bonds increase, then hydrolytic degradation will also increase. Polymer precursors which are branched will increase the degree of crosslinking and branching which will increase molecular weight. Polymer precursors which contain an ether bond will increase the amount of moisture absorption. Aromatic polymer precursors will have greater strength, melting point, and heat resistance than similar aliphatic polymer precursors. Halocarbon polymer precursors may improve resistance to chemical such as acids and alkalis, as well as resistance to fire, bacteria, mold, and UV light.

The most important property of lignin and polymer precursors is the compatibility with each other. If lignin and the polymer precursors are not compatible, either a lignin hybrid polymer will not form or the lignin hybrid polymer will have poor quality and properties. Compatible lignin and polymer precursors can be found either experimentally or using HSP as described above. Compatible materials tend to have a significant amount of hydroxyls, carboxyls, and amines.

Materials that may be compatible with lignin include polymers, polymers precursors, and unreactive solvents. Unreactive solvents by themselves are not capable of undergoing polymerization and thus are not acceptable as polymer precursors. Reactive solvents that are capable of undergoing polymerization with lignin are regarded herein as polymer precursors. Polymer precursors are chemicals which can undergo polymerization to form polymers. Polymer precursors include both monomers and oligomers.

Polymer precursors have several advantages over polymers to manufacture lignin hybrid polymers. First, polymer precursors are relatively small molecules and have greater capacity to disassociate lignin dimers and expose the functional groups. When more functional groups are exposed, then the lignin hybrid polymer will have a greater degree of crosslinking which will improve properties such as strength, fire resistance, and chemical resistance. Second, polymer precursors provide greater flexibility to create lignin hybrid polymers with a wider range of properties. Third, polymer precursors cost significantly less than polymers. The use of lignin and compatible polymer precursors provides a cost-effective method to produce lignin hybrid polymers with a wide range of properties. Finally, compatible polymers (i.e. already-made polymers) will react and form molecules of lignin hybrid polymers which have extremely high molecular weights. In many applications, the extremely high molecular weights cause high viscosity which is undesirable.

Some variations of the invention provide a lignin hybrid polymer precursor composition comprising from about 1 wt % to about 99 wt % of lignin and from about 1 wt % to about 99 wt % of a lignin-compatible blend of at least two distinct polymer precursors, wherein at least one of the polymer precursors has a chemical bond with the lignin.

In various embodiments, lignin is present in the lignin hybrid polymer precursor composition at a concentration of about, at least about, or at most about 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, or 99 wt %, including all intermediate ranges (e.g., 10-50 wt % or 30-90 wt %).

In various embodiments, a lignin-compatible blend of at least two distinct polymer precursors is present in the lignin hybrid polymer precursor composition at a concentration of about, at least about, or at most about 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, or 99 wt %, including all intermediate ranges (e.g., 50-90 wt % or 5-35 wt %).

Within a lignin-compatible blend of at least two distinct polymer precursors, a first polymer precursor may be present in the lignin-compatible blend at a concentration of about 0.1, 0.5, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 98.5, or 99 wt %, including all intermediate ranges. The second polymer precursor may be present in the lignin-compatible blend at a concentration of about 0.1, 0.5, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 98.5, or 99 wt %, including all intermediate ranges. Additional polymer precursors, if present, may be in the lignin-compatible blend at a concentration of about 0.05, 0.1, 0.5, 1, 2, 3, 4, 5, 10, 15, 20, 25, 30, 35, 40, 45, or 50 wt %, or higher, including all intermediate ranges.

In the lignin hybrid polymer precursor composition, the average weight ratio of lignin to total polymer precursors may vary, such as from about 0.01 to about 100, or from about 0.1 to about 10. In various embodiments, the average weight ratio of lignin to total polymer precursors is about, at least about, or at most about 0.01, 0.02, 0.05, 0.1, 0.2, 0.5, 1, 2, 5, 10, 20, 30, 40, 50, 60, 70, 80, 90, 95, or 100, including all intermediate ranges.

In the lignin hybrid polymer precursor composition, the average weight ratio of lignin to an individual type of polymer precursor may vary, such as from about 0.01 to about 500, or from about 0.1 to about 200. In various embodiments, the average weight ratio of lignin to an individual type of polymer precursor is about, at least about, or at most about 0.02, 0.05, 0.1, 0.2, 0.5, 1, 2, 5, 10, 20, 30, 40, 50, 75, 100, 150, 200, 250, 300, 350, 400, 450, or 500, including all intermediate ranges. An individual type of polymer precursor means a specific alcohol, aldehyde, amine, etc., not an individual molecule.

In some embodiments, the concentration of polymer precursors is selected based on the lignin molecular weight in the starting composition (i.e. the lignin hybrid polymer precursor composition). For example, it may be desirable for each monomer unit of lignin to be bonded to a polymer precursor. Or it may be desirable for only certain lignin monomers (p-coumaryl alcohol, coniferyl alcohol, and/or sinapyl alcohol) to be bonded to a polymer precursor. In related embodiments, it may be desirable for there to be present a molecule or a polymer precursor for each lignin monomer, or certain lignin monomers, even if that polymer precursor is not actually bonded to those lignin monomers (but may become bonded later, during reaction).

In some embodiments, there is an average of one unit of lignin-compatible polymer precursor blend for every lignin repeat unit present (counting all types of lignin repeat units). One "unit" of lignin-compatible polymer precursor blend refers to two polymer-precursor molecules when there are two types of polymer precursors in the blend, three polymer-precursor molecules when there are three types of polymer precursors in the blend, and so on. In various embodiments, the average ratio of units of lignin-compatible polymer precursor blend to lignin repeat units is about, at least about, or at most about 0.01, 0.02, 0.05, 0.1, 0.2, 0.3, 0.4, 0.5, 0.6, 0.7, 0.8, 0.9, 0.95, or 1. In certain embodiments employing a stoichiometric excess of polymer precursors, the average ratio of units of lignin-compatible polymer precursor blend to lignin repeat units is about, at least about, or at most about 1.05, 1.1, 1.2, 1.3, 1.4, 1.5, 2, 2.5, 3, 4, 5, or 10, for example.

Some variations of the invention provide a lignin hybrid polymer produced by polymerizing, crosslinking, curing, or otherwise reacting a disclosed composition, wherein the lignin hybrid polymer contains the lignin and a reacted variant of the polymer precursors.

In various embodiments, lignin is present in the lignin hybrid polymer at a concentration of about, at least about, or at most about 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 99, or 99.5 wt %, including all intermediate ranges (e.g., 3-40 wt % or 25-95 wt %). Compared to the lignin concentration in the lignin hybrid polymer precursor composition, the lignin concentration in the lignin hybrid polymer may be higher due to water loss in reaction or volatilization of some polymer precursors during polymerization, for example.

In various embodiments, the reacted variant of the lignin-compatible blend of polymer precursors may be present in the lignin hybrid polymer at a concentration of about, at least about, or at most about 0.5, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, or 99 wt %, including all intermediate ranges (e.g., 1-20 wt % or 20-70 wt %). Compared to the polymer-precursor concentration in the lignin hybrid polymer precursor composition, the concentration of the reacted form of the polymer precursors in the lignin hybrid polymer may be similar, lower, or higher, depending on the chemistry involved and volatilization during polymerization, for example.

The molecular weight of lignin may increase, decrease, or stay the same during conversion of the lignin hybrid polymer precursor composition to the lignin hybrid polymer. Typically, the lignin polymer that is present initially does not undergo further polymerization itself. Because the polymer precursors are polymerized and reacted with lignin, the overall polymer molecular weight does typically increase beyond the starting molecular weight of the lignin. It is possible for the lignin portion of the polymer to increase in molecular weight during overall reaction involving the polymer precursors (e.g., condensation reactions or crosslinking). It is possible for the lignin portion of the polymer to decrease in molecular weight, when some lignin fragmentation occurs during overall reaction.

As stated earlier, the polymer precursors are monomers or oligomers. When a polymer precursor is an oligomer, it may be an oligomer with degree of oligomerization of 2, 3, 4, 5, 6, 7, 8, 9, or 10, for example. In some embodiments, only oligomers up to degree of oligomerization of 5 are employed as the polymer precursors. In certain embodiments, only monomers, dimers, and trimers are employed as the polymer precursors. In specific embodiments, only monomers and dimers are employed as the polymer precursors. In certain specific embodiments, only monomers are employed as the polymer precursors. During reaction and conversion of the lignin hybrid polymer precursor composition to the lignin hybrid polymer, the molecular weight of the polymer precursor molecule typically increases. In some embodiments, the polymer precursor undergoes formal polymerization (e.g., condensation or addition polymerization). In some embodiments, the polymer precursor reacts with lignin and produces a larger molecule, even though the polymer precursor molecule may be a similar size or even slightly smaller such as when a molecule of water is evolved during reaction. Many reaction pathways are possible. The resulting lignin hybrid polymer will have lignin and a reacted form of polymer precursors that may be present in any portion of the polymer chain, which may be linear, branched, or cyclic, may be crosslinked or uncrosslinked, and may have a variety of repeat-unit configurations (e.g., alternating, block, random, etc.).

The reaction of lignin and polymer precursors will significantly affect the properties of lignin hybrid polymers. The reaction can be as simple as a single-step condensation reaction of lignin and polymer precursor. Additional steps can be added to condensation reactions to further modify the properties of the lignin hybrid polymers. Furthermore, reaction steps can be added either before or after the essential condensation reactions to further modify the properties of lignin hybrid polymers.

The simplest reaction of lignin and polymer precursors is a condensation reaction. The reaction can be performed in a heated vessel (e.g., at temperatures from about 50-250° C.) with agitation. When lignin and the precursor achieve reaction temperature, lignin and the polymer precursors will react with each other, forming lignin hybrid polymers. During the reaction, water or volatiles or a combination thereof will be generated. In some cases a portion of the polymer precursor may also evaporate. The reaction may be stopped by removing the lignin hybrid polymer from heat.

The condensation reaction can be further improved by performing the reaction under vacuum. Vacuum will significantly reduce the time needed to complete the condensation reaction. Also, the required temperature to complete the condensation reaction can be reduced. The vacuum may also remove a portion of the polymer precursors and volatile fractions of lignin which could cause a significant discrepancy between the initial stoichiometric ratios and the stoichiometric ratios of the lignin hybrid polymer.

The process can be further modified with multiple steps where lignin is further refined and selectively reacted to produce a highly specific lignin hybrid polymer. In addition, each reaction step may have specific conditions such as temperature, pressure or vacuum, the reaction time, the presence and type of catalyst, material addition rates, inert-gas blanket, etc. The reactions conditions can control the quantity, type, and location of bonds between lignin and the polymer precursors. The quantity, type, and location of bonds will affect properties like molecular weight, hydroxyl number, acid number, and viscosity. Typically, higher temperatures or longer reaction times or a combination of both will result in increased bond formation which will increase molecular weight and decrease hydroxyl and acid numbers.

Increasing temperature, vacuum, or both will increase the evaporation rate of water, volatile content, and unreacted precursors.

The properties of a lignin hybrid polymer can be further modified with additional reaction steps. The reaction steps can be performed before or after the primary reaction of lignin and the polymer precursors.

One additional processing step could consist of blending a polymer precursor and lignin, and then the lignin blend could be processed with an ion exchange resin to remove any inorganic ion content. The ion exchange resin could be cationic (removes cations), anionic (removes anions), or amphoteric (removes both cations an anions).

Another, additional processing step could consist of blending a polymer precursor and lignin until the lignin is dissolved, then adding a hexane or similar solvent, and then conducting low-temperature vacuum distillation to remove any sugars, polysaccharides, or other undesirable compounds.

Another, additional process could consist of adding additional materials or performing ion exchange, or gas sparging. Gas sparging consists of bubbling gas through the reactor to remove any unreacted materials. Steam, nitrogen, or an inert gas could be used for sparging.

The reaction of lignin and polymer precursors could occur in several steps. The first step could be blending lignin and alcohol. The second step could be performing ion exchange of the lignin and alcohol blend. The third step could be adding carboxylic acids and performing vacuum distillation which would cause an esterification reaction and remove excess alcohol. The fourth step process could consist of adding amines which would cause an amidization reaction. The fifth step could consist of performing gas sparging.

In addition, the properties can be further modified with crosslinkers and additives to improve properties such as molecular weight, viscosity, acid number, hydroxyl number, functionality, crosslinking, crystallinity, biodegradability, odor, ash content, inorganic content, flammability, UV resistance, chemical resistance, thermal resistance, heat distortion, improved heat sag, UV resistance, compressive strength, tensile strength, and/or flexural modulus. A wide array of additives are used throughout the plastics industry to modify the properties of coatings, adhesives, sealants, elastomers, binders, thermoset resins, thermoplastic resins, and polyurethane systems.

Furthermore, the lignin hybrid polymer produced from the reaction of lignin and polymer precursors will result in HSP values which are significantly different from the HSP values of the lignin and polymer precursors initially used. The HSP values of the blend of lignin and polymer precursors will not be the same as the HSP values of the lignin hybrid polymer produced from the reaction of lignin and the polymer precursors. The HSP values of the unreacted functional groups are not the same as the HSP values of the resulting chemical bonds from the reacted functional groups. Also, additives and crosslinkers can be used to further modify the HSP values of a lignin hybrid polymer.

The term "polyol" is used herein to refer to a polymer primarily made from the condensation reaction of alcohols, anhydrides, carboxylic acids, and combinations thereof which result in a polymer which has typically two or more hydroxyl groups per molecule. In some cases, amines or other polymer precursors may be used in the formation of a polyol. The end use or application of the polyol depends on the chemical properties of the polyol. Polyols are typically crosslinked with isocyanate resulting in polyurethane. In some cases, amines are used as a crosslinker. Polyols with a low molecular weight and more than two hydroxyl groups per molecule are used in rigid polyurethane applications. Polyols with a high molecular weight and approximately two hydroxyl groups per molecule are used in flexible polyurethane applications.

Catalysts and various additives may be used to further improve the reaction, processing, and physical properties of the polyurethane (or other polymer). Polyurethanes are used throughout the construction, automotive, and consumer products industries as flexible foam, rigid foam, coatings, adhesives, sealants, elastomers, binders, print rollers, shoe soles, flooring, and synthetic fibers.

The term "thermoplastic resin" is used herein to refer to a polymer which can be molded when it is above a specific temperature and solidifies when it is below the specific temperature. Thermoplastic resins can be reheated, melted, and reformed. Thermoplastic resins are not crosslinked. Thermoplastics can be blended with various additives to improve processing and physical properties. Thermoplastics are used to make a wide variety of products across many industries including, but not limited to, packaging, automotive, electronics, construction, medical, consumer, and 3-D printing. Packaging products include, but are not limited to, bottles, caps, bags, and packaging film. Automotive products include, but are not limited to fascias, trim, brackets, housings, handles, and light lenses. Construction materials include, but are not limited to, carpets, pipes, electrical housings, vinyl siding, gutters, and roofing. Medical products include, but are not limited to, prosthetics, devices, implants, and tubing. Consumer products include, but are not limited to, fabric, clothing, toys, storage bins, toys, and appliances. 3-D printing products include, but are not limited to, thermoplastic filaments.

The term "thermoset resin" is used herein to refer to a polymer which can be molded into a desired shape and crosslinked which will cause the polymer to become rigid and permanently retain the desired shape. Crosslinked thermoset polymers tend to have greater rigidity and strength than thermoplastic polymers. Many different thermoset polymers are possible such as polyester, polyurethane, polyurea, phenol-formaldehyde, urea-formaldehyde, melamine, epoxy, epoxy-novolac, and polyimide. Thermoset resins can be used in a variety of applications including, but not limited to, sheet molding compounds, bulk molding compounds, filament winding, wet lay-up lamination, coatings, flooring, synthetic fiber, pre-impregnated fibers, carbon fiber, electrical insulators, plastic ware, sealing and joining, printed circuit boards, electrical encapsulation, cements, adhesives, binders, and casting/foundry resins. Thermoset resins are often reinforced with glass fibers or other materials. Various catalysts and additives are used to both improve the processing and the physical properties.

The term "alcohol" is used herein to refer to a compound having an alcohol functional group (—OH). Alcohols can include, but are not limited to, monohydric alcohols, unsaturated aliphatic alcohols, aliphatic diols, glycols, aromatic alcohols, and polyhydric alcohols. Suitable monohydric alcohols include, but are not limited to, methanol, ethanol, propanol, and isopropanol. Suitable unsaturated aliphatic alcohols include, but are not limited to, allyl alcohol, geraniol, and propargyl alcohol. Suitable aliphatic diols include, but are not limited to, 1,3-propandiol, 1,4-butandiol, 1,5-pentandiol, 1,6-hexandiol, 1, 7-heptandiol, 1,8-octandiol, 1,9-nonandiol, 1,10-decandiol, 1,11-undecandiol, 1,12-dodecandiol, 1,13-tridecandiol, 2-methyl-1,3-propanediol, 2,2,4,4-tetramethyl-1,3-cyclobutanediol, 2,2,4,4-tetramethyl-1,3-cyclobutanediol, 3-methyl-1,5-pentanediol, 1,3- cyclohexanediyldimethanol, cyclohexanedimethanol, and methanol. Suitable glycols include, but are not limited to, ethylene glycol, propylene glycol, 1,2-butylene glycol, 1,3-butylene glycol, neopentyl glycol, propylene glycol, dipropylene glycol, tripropylene glycol, triethylene glycol, and tetraethylene glycol. Suitable aromatic alcohols include phenol, bisphenol A, and ethoxylates. Suitable polyhydric alcohols include glycerol, pentaerythritol, sorbitol, and trimethylolpropane.

The term "aldehyde" is used herein to refer to a compound having an aldehyde functional group (—CHO). Suitable aldehydes can be aliphatic and cyclic. Also, aldehydes can be monofunctional, difunctional, or multifunctional. Suitable aliphatic aldehydes include, but are not limited to, formaldehyde (including paraformaldehyde), acetaldehyde (including paraacetaldehyde), propionaldehyde, butyl aldehyde, amyl aldehyde, hexyl aldehyde, and heptyl aldehyde. Suitable cyclical aldehydes include, but are not limited to, cyclohexyl aldehyde, furfural, benzaldehyde, 2-methyl benzaldehyde, 3-methyl benzaldehyde, 4-methyl benzaldehyde, p-hydroxy benzaldehyde, m-hydroxy benzaldehyde, phenyl acetaldehyde, and phenyl propionaldehyde. Suitable multifunctional aldehydes include, but are not limited to, glutaraldehyde glyoxal, malondialdehyde, succindialdehyde, glutardialdehyde, adipindialdehyde, and terephthaldialdehyde The term "amine" is used herein to refer to a compound having an amino functional group (—NH$_2$, —NHR, and/or —NR$_2$). Suitable amines can be aliphatic, alicyclic, and aromatic. Also, amines can be monofunctional, difunctional, or multifunctional. Suitable aliphatic monoamines include, but are not limited to, methylamine, ethylamine, propylamine, butylamine, hexylamine, octylamine, decylamine, stearylamine, dimethylamine, diethylamine, dipropylamine, and dibutylamine. Suitable alicyclic monoamine include, but are not limited to, cyclohexylamine and dicyclohexylamine. Suitable aromatic monoamine include, but are not limited to, aniline, toluidine, diphenylamine or naphthylamine. Suitable aliphatic diamines include, but not limited to, aliphatic 1,2-ethylenediamine, 1,3-trimethylenediamine, 1,4-tetramethylenediamine, 5-pentamethylenediamine, 2-methyl-1,5-pentamethylenediamine, 1,6-hexamethylenediamine, 1,7-heptamethylenediamine, 1,8-octamethylenediamine, 1,9-nonamethylenediamine, 2-methyl-1,8-octamethylenediamine, 1,10-decamethylenediamine, 1,11-undecamethylenediamine, 1,12-dodecamethylenediamine, 1,13-tridecamethylenediamine, 1,16-hexadecamethylenediamine, 1,18-octadecamethylene-diamine or 2,2,4(or 2,4,4)-trimethylhexamethylenediamine; alicyclic diamine such as piperazine, cyclohexanediamine, bis(3-methyl-4-aminohexyl)methane, bis(4,4'-amino-cyclohexyl)methane, and isophoronediamine. Suitable aromatic diamines include, but not limited to, m-xylylenediamine, p-xylylenediamine, p-phenylenediamine, m-phenylenediamine, and hydrogenated products thereof. Also, the amines can be polyetheramines with monofuctionality, diafunctionality, or multifunctionality. For example, Huntsman manufactures monoamines, diamines, and multifunctional amines under the trade name JEFFAMINE®.

The term "carboxylic acid" is used herein to refer to a compound having a carboxylic acid group (—C(=O)OH) and includes the anhydride of the acid ((RC(=O))$_2$O). Suitable carboxylic include, but are not limited to, aliphatic carboxylic acids, cycloaliphatic carboxylic acids, aromatic carboxylic acids, and branched carboxylic acids. Also, carboxylic acids can be monofunctional, difunctional, or multifunctional. Suitable mono carboxylic acids include, but are not limited to, acetic acid, propanoic acid, butanoic acid, hexanoic acid, oleic acid, linoleic acid, nonanoic acid, undecanoic acid, lauric acid, isononanoic acid, and other fatty acids. Suitable dicarboxylic acids include, but are not limited to, adipic acid, azelaic acid, sebacic acid, succinic acid, glutaric acid, decanoic diacid, dodecanoic diacid, cyclohexanedioic acid, maleic acid, hydrogenated fatty acids, and anhydrides thereof. Suitable cycloaliphatic carboxylic acids include, but are not limited to, cyclohexane carboxylic acid, tricyclodecane carboxylic acid, and camphoric acid. Suitable aromatic carboxylic acids include, but are not limited to benzoic acid, t-butylbenzoic acid, phthalic acid, terephthalic acid, isophthalic acid, trimellitic acid, naphthalene dicarboxylic acids, pyromellitic acid, and 2,5-furandicarboxylic acid. Suitable multifunctional carboxylic acids include, but are not limited to, citric acid, aconitic acid, isocitric acid, and sorbic acid.

The term "halocarbon" is used herein to refer to a compound which has a halogen atom covalently bonded to a carbon atom. Halogens atoms include fluorine, chlorine, bromine, and iodine. Suitable halocarbons include organofluorine compounds, organochlorine compounds, organobromine compounds, and organoiodine compounds. Some polymer precursors will contain more than one type of functional group such as hydroxy acids, amino acids, and amino alcohols. Hydroxy acids contain both carboxyl (—C(=O)OH) and hydroxyl (—OH) groups. Suitable hydroxy acids include, but are not limited to, lactic, malic, glycolic, butyric, valeric, hexanoic, heptanoic, octanoic, nonanoic, decanoic, undecanoic, dodecanoic, tridecanoic, tetradecanoic, pentadecanoic, hexadecanoic, heptadecanoic, octadecanoic, and salicyclic acid. Amino acids contain both amine (—NH$_2$, —NHR, and/or —NR$_2$) and carboxyl (—C(=O)OH) functional groups. Suitable amino acids include, but are not limited to, alanine, arginine, asparagine, aspartic acid, cysteine, glutamic acid, glutamine, glycine, histidine, isoleucine, leucine, lysine, methionine, phenylalanine, proline, serine, threonine, tryptophan, tyronsie, valine, selenocysteine, and pyrrolysine. Amino alcohols contain hydroxyl (—OH) and amino functional groups (—NH$_2$, —NHR, and/or —NR$_2$). Suitable amino alcohols include, but are not limited to, methanolamine, ethanolamine, aminomethyl propanol, diglycolamine, diethanolamine, diisopropanolamine, methyldiethanolamine, heptaminol, n-methylethanolamine, isoetarine, phenylpropanolamine, and sphingosine.

The term "blending" refers to forming a single phase comprising or consisting of lignin and polymer precursors if performed prior to reaction, or forming a single phase comprising or consisting of lignin hybrid polymer and an additive if performed after the reaction. In some embodiments, during blending, lignin and polymer precursors are not polymerized.

The term "pre-processing" refers to process steps before lignin and the polymer precursor are reacted. During pre-processing, the lignin and polymer precursors are further refined or purified to allow the lignin and polymer precursor to react without the interference of impurities. Pre-processing steps may include, but are not limited to, ion exchange, solvent distillation, centrifugation, filtration, gas sparging, pH adjustment, temperature adjustment, agitation, and so on.

The term "reaction" is used herein to refer to the process by which bonds are formed between lignin and polymer precursors, resulting in a lignin hybrid polymer. The bonds will be formed between the various functional groups found on lignin and at least one of the polymer precursors. The bonds between lignin and polymer precursors can include, but are not limited to, esters, ethers, urethane, amide, imide, acetals, ketals, urethane, and/or carbamate. A lignin hybrid polymer could be generated via several reactions performed as part of a multi-reaction process. The reactions may include cleavage, condensation, replacement, or a combination thereof.

The term "post-processing" refers to processing after a lignin hybrid polymer is formed. During post-processing, unreacted lignin, unreacted polymer precursors, and byproducts may be removed. Post-processing steps may include, but are not limited to, ion exchange, solvent distillation, centrifugation, filtration, gas sparging, pH adjustment, temperature adjustment, etc.

The term "crosslinker" refers to a compound which reacts with the lignin hybrid polymers, forming a larger polymeric matrix. In some cases, lignin hybrid polymers with different functionalities are used to crosslink each other. Suitable crosslinkers include, but are not limited to, phenolic resins, amino resins, epoxy resins, beta-hydroxy (alkyl) amide resins, alkylated carbamate resins, isocyanates, polyacids, anhydrides, organometallic acid-functional materials, polyamines, polyamides, aminoplasts, and mixtures thereof. Suitable isocyanates include, but are not limited to, hexamethylene diisocyanate, isophorone diisocyanate, toluene diisocyanate, and methylene diphenyl 4,4'-diisocyanate (also known as 4,4'-diphenylmethane diisocyanate).

The term "curing" refers to bond formation between the lignin hybrid polymer and crosslinker, resulting in the formation of a crosslinked polymer. Curing may occur upon application of an external stimulus including, but not limited to, heat, ultraviolet irradiation, exposure to moisture, and/or exposure to atmospheric oxygen.

The term "catalyst" refers to a compound which increases the reaction rate between lignin and polymer precursors or between a lignin hybrid polymer and crosslinker. Suitable catalysts include, but are not limited to, sulfuric acid, phosphoric acid, alkyl aryl sulphonic acid, dodecyl benzene sulphonic acid, dinonyl naphthalene sulphonic acid, and dinonyl naphthalene, disulphonic acid, complexes of organometallic compounds including tin, zinc, or bismuth, peroxides such as benzoyl peroxide and methyl ethyl ketone peroxide, or amines such as bis-(2-dimethylaminoethyl) ether, N,N-dimethylethanolamine, triethylene diamine, benzyldimethylamine, N,N-dimethylcyclohexylamine, N-ethylmorpholine, N-methylmorpholine, dimethylpiperazine, 2,2'-dimorpholinodiethylether, 1-methyl-4-(2-dimethylaminoethyl)piperazine, and N,N,N'-trimethyl-N'-hydroxyethyl-bisaminoethylether.

The term "additives" refers to compounds which improve the properties of the lignin hybrid polymer without chemically altering the lignin hybrid polymer, but may change the functional groups of the polymer. Additives can include blowing agents, surfactants, solvents, plasticizers, reinforcements, lubricants, impact modifiers, fire retardants, oxygen scavengers, acid scavengers, and mold release agents. Suitable reinforcement additives include, but are not limited to, glass fibers, glass fiber/polyolefin composites, carbon nanotubes, carbon whiskers, layered clays, and metal oxide nanotubes. Suitable lubricants include, but are not limited to, stearic acid, PTFE, and molybdenum disulfide. Suitable impact modifiers include, but are not limited to, ethylenepropylene rubber. Suitable fillers include, but are not limited to, calcium carbonate, talc, and carbon black.

The invention may assume various alterations in the reaction process such as step addition or removal, sequence change of the reaction steps, modifications to the reactions conditions except where explicitly stated to the contrary.

In some variations, a process for producing a lignin hybrid polymer produced by esterification comprises the following steps:

1. Add lignin and polymer precursors to a suitable vessel with heating, agitation, and vacuum.
2. Blend materials with heat and vacuum. All materials will form a single phase at approximately 45° C.
3. React materials with heat and agitation while under vacuum until the desired degree of bonding is achieved. Water vapor and volatile components will begin to evolve at approximately 85° C. Depending on the materials, used the esterification temperature can be anywhere between 85° C. to 300° C. A suitable temperature is typically between 125° C. and 200° C. The esterification reaction will generally stop when temperature is below 60° C. The degree of esterification is indicated by the amount of water evolved and the molecular weight of the lignin polyester hybrid polymer.

If a lignin hybrid polymer is required with greater purity, additional processing steps can be added. In some embodiments, a process for esterification comprises:

1. Add lignin and excess alcohol to a suitable vessel with heating and agitation. Excess alcohol is preferred to reduce the viscosity of the blend, so that the blend will pass through an ion-exchange bed.
2. Blend materials with heat until all materials form a single phase.
3. Expose the lignin-alcohol blend to ion-exchange resin until contaminates are removed.
4. Add additional polymer precursors to the lignin-alcohol blend.
5. React materials with heat and agitation while under vacuum until the desired degree of esterification is achieved and excess alcohol is removed. Water vapor and volatile components will begin to evolve at approximately 85° C. Depending on the materials used, the esterification temperature can be anywhere between 85° C. to 300° C. A suitable temperature is typically between 125° C. and 200° C. The degree of esterification is indicated by the amount of water evolved and the molecular weight of the lignin polyester hybrid polymer. The amount of excess alcohol is indicated by the amount of alcohol collected by vacuum distillation.
6. Start gas sparging to remove any remaining undesirable components.

The excess alcohol can be also be removed by solvent distillation, centrifugation, filtration, and/or gas sparging if vacuum distillation alone is ineffective. Additional steps can be added to further change the properties of the lignin hybrid polymer. The hydroxyl or acid number can be reduced by the reaction of a lignin hybrid polymer with a monofunctional carboxylic acid, an alcohol, an amine, and/or a halocarbon. Also, the properties of the lignin hybrid polymer may be further modified with halocarbon compounds and additives.

One embodiment of this invention is a lignin hybrid polymer in the form of a polyol. The lignin hybrid polyol can be crosslinked with isocyanate to form polyurethane. The polyurethane could be a rigid foam, flexible foam, or elastomer depending on the properties of the lignin hybrid polyol, isocyanate, and additives. The composition of a lignin hybrid polyol may be, by weight, about 5-60% lignin, 0-60% alcohol, 0-60% aldehydes, 0-60% amines, 0-60% anhydrides, 0%-60% carboxylic acid, 0%-60% halocarbons, 0%-60% hydroxy acids, 0%-60% amino acids, and 0%-60% amino alcohols. Lignin and polymer precursors must be compatible with each other.

The lignin hybrid polyol can be further specified depending on polymer precursors reacted with lignin.

If the polymer precursors do not contain ethers and the polymer precursors include alcohols, anhydrides, carboxylic acids, hydroxy acids, or a combination thereof, then the lignin hybrid polyol will be a lignin polyester hybrid polyol.

If the polymer precursors contain ethers and the polymer precursors include alcohols, anhydrides, carboxylic acids, hydroxy acids, or a combination thereof, then the lignin hybrid polyol will be a lignin polyester polyether hybrid polyol.

If the polymer precursors do not contain ethers and the polymer precursors include alcohols, anhydrides, carboxylic acids, hydroxy acids, or a combination thereof, and an amine where the quantity of amine moiety is sufficient to prevent ester formation, then the lignin hybrid polyol will be a lignin polyamide hybrid polyol.

If the polymer precursors do not contain ethers and the polymer precursors include alcohols, anhydrides, carboxylic acids, hydroxy acids, or a combination thereof, and an amine, amino acids, amino alcohols, or combination thereof wherein the quantity of amine moiety is not sufficient to prevent ester formation, then the lignin hybrid polyol will be a lignin polyester polyamide hybrid polyol.

If the polymer precursors contain ethers and the polymer precursors include alcohols, anhydrides, carboxylic acids, hydroxy acids, or a combination thereof, and an amine, amino acids, amino alcohols, or combination thereof wherein the quantity of amine moiety is not sufficient to prevent ester formation, then the lignin hybrid polyol will be a lignin polyester polyether polyamide hybrid polyol.

If the polymer precursors have short chains ($C_2$-$C_4$), and the polymer precursors include alcohols, amines, anhydrides, carboxylic acids, hydroxy acids, amino acids, amino alcohols, or a combination thereof, then the lignin hybrid polyol will be a biodegradable lignin hybrid polyol.

Lignin hybrid polyols can be further modified with halogens, halocarbons, and additives. Halogenated lignin hybrid polyols are another embodiment.

Another embodiment of this invention consists of a lignin hybrid polymer in the form of a thermoplastic resin. The properties of the lignin hybrid thermoplastic resin depend on the properties of the lignin, polymer, precursors, and additives. The composition of a lignin polyester hybrid thermoplastic resin may be about, by weight, 40-95% lignin, 0-40% alcohol, 0-40% aldehydes, 0-40% amines, 0-40% anhydrides, 0%-40% carboxylic acid, 0%-40% halocarbons, 0%-40% hydroxy acids, 0%-40% amino acids, and 0%-40% amino alcohols. The lignin and polymer precursors must be compatible with each other.

The lignin hybrid thermoplastic resin embodiment can be further specified depending on polymer precursors reacted with lignin.

If the polymer precursors do not contain ethers and the polymer precursors include alcohols, anhydrides, carboxylic acids, hydroxy acids, or a combination thereof, then the lignin hybrid thermoplastic resin will be a lignin polyester hybrid thermoplastic resin.

If the polymer precursors contain ethers and the polymer precursors include alcohols, anhydrides, carboxylic acids, hydroxy acids, or a combination thereof, then the lignin hybrid thermoplastic resin will be a lignin polyester polyether hybrid thermoplastic resin.

If the polymer precursors do not contain ethers and the polymer precursors include alcohols, anhydrides, carboxylic acids, hydroxy acids, or a combination thereof, and an amine where the quantity of amine moiety is sufficient to prevent ester formation, then the lignin hybrid thermoplastic resin will be a lignin polyamide hybrid thermoplastic resin.

If the polymer precursors do not contain ethers and the polymer precursors include alcohols, anhydrides, carboxylic acids, hydroxy acids, or a combination thereof, and an amine, amino acids, amino alcohols, or combination thereof wherein the quantity of amine moiety is not sufficient to prevent ester formation, then the lignin hybrid thermoplastic resin will be a lignin polyester polyamide hybrid thermoplastic resin.

If the polymer precursors contain ethers and the polymer precursors include alcohols, anhydrides, carboxylic acids, hydroxy acids, or a combination thereof, and an amine, amino acids, amino alcohols, or combination thereof wherein quantity of amine moiety is not sufficient to prevent ester formation, then the lignin hybrid thermoplastic resin will be a lignin polyester polyether polyamide hybrid thermoplastic resin.

If the polymer precursors do not contain ethers and the polymer precursors include alcohols, anhydrides, carboxylic acids, hydroxy acids, or a combination thereof, and aldehydes wherein the quantity of aldehyde moiety is sufficient to prevent ester formation, then the lignin hybrid thermoplastic resin will be a lignin polyacetal hybrid thermoplastic resin.

If the polymer precursors do not contain ethers and the polymer precursors include alcohols, anhydrides, carboxylic acids, hydroxy acids, or a combination thereof, and aldehydes wherein the quantity of aldehyde moiety is not sufficient to prevent ester formation, then the lignin hybrid thermoplastic resin will be a lignin polyester polyacetal hybrid thermoplastic resin.

If the polymer precursors contain ethers and the polymer precursors include alcohols, anhydrides, carboxylic acids, hydroxy acids, or a combination thereof, and aldehydes wherein the quantity of aldehyde moiety is not sufficient to prevent ester formation, then the lignin hybrid thermoplastic resin will be a lignin polyester polyether polyacetal hybrid thermoplastic resin.

If the polymer precursors do not contain ethers and the polymer precursors include alcohols, anhydrides, carboxylic acids, hydroxy acids, or a combination thereof; and an amine, amino acids, amino alcohols, or combination thereof wherein the quantity of amine moiety is not sufficient to prevent ester formation; and aldehydes; then the lignin hybrid thermoplastic resin will be a lignin polyester polyacetal polyamide hybrid thermoplastic resin.

If the polymer precursors contain ethers and the polymer precursors include alcohols, anhydrides, carboxylic acids, hydroxy acids, or a combination thereof; and an amine, amino acids, amino alcohols, or combination thereof wherein the quantity of amine moiety is not sufficient to prevent ester formation; and aldehydes; then the lignin hybrid thermoplastic resin will be a lignin polyester polyether polyacetal polyamide hybrid thermoplastic resin.

If the polymer precursors have short chains ($C_2$-$C_4$), and the polymer precursors include alcohols, aldehydes, amines, anhydrides, carboxylic acids, hydroxy acids, amino acids, amino alcohols or a combination thereof, then the lignin hybrid thermoplastic resin will be a biodegradable lignin hybrid thermoplastic resin.

Lignin hybrid thermoplastic resin can be further modified with halogens, halocarbons, and additives. Halogenated lignin hybrid thermoplastics are another embodiment.

Another embodiment of this invention consists of a lignin hybrid polymer in the form of a thermoset resin. The lignin hybrid thermoset resin can be crosslinked with a catalyst to form a rigid thermoset plastic. The properties of the lignin hybrid thermoset resin depend on the properties of the lignin, polymer precursors, and additives. In some embodiments, one or more polymer precursors contain unsaturated carbon bonds which can be crosslinked to form a rigid plastic. The composition of lignin hybrid thermoset resin may be about, by weight, 40-95% lignin, 0-40% alcohol, 0-40% aldehydes, 0-40% amines, 0-40% anhydrides, 0%-40% carboxylic acid, 0%-40% halocarbons, 0%-40% hydroxy acids, 0%-40% amino acids, and 0%-40% amino alcohols. The lignin and polymer precursors must be compatible with each other.

The lignin hybrid thermoset resin embodiment can be further specified depending on polymer precursors reacted with lignin.

If the polymer precursors do not contain ethers and the polymer precursors include alcohols, anhydrides, carboxylic acids, hydroxy acids, or a combination thereof, then the lignin hybrid thermoset resin will be a lignin polyester hybrid thermoset resin.

If the polymer precursors contain ethers and the polymer precursors include alcohols, anhydrides, carboxylic acids, hydroxy acids, or a combination thereof, and one or more of the polymer precursors contain unsaturated carbon bonds, then the lignin hybrid thermoset resin will be a lignin polyester polyether hybrid thermoset resin.

If the polymer precursors do not contain ethers and the polymer precursors include alcohols, anhydrides, carboxylic acids, hydroxy acids, or a combination thereof, and an amine where the quantity of amine moiety is sufficient to prevent ester formation, and one or more of the polymer precursors contain unsaturated carbon bonds, then the lignin hybrid thermoset resin will be a lignin polyamide hybrid thermoset resin.

If the polymer precursors do not contain ethers and the polymer precursors include alcohols, anhydrides, carboxylic acids, hydroxy acids, or a combination thereof, and an amine, amino acids, amino alcohols, or combination thereof wherein the quantity of amine moiety is not sufficient to prevent ester formation, and one or more of the polymer precursors contain unsaturated carbon bonds, then the lignin hybrid thermoset resin will be a lignin polyester polyamide hybrid thermoset resin.

If the polymer precursors contain ethers and the polymer precursors include alcohols, anhydrides, carboxylic acids, hydroxy acids, or a combination thereof, and an amine, amino acids, amino alcohols, or combination thereof wherein quantity of amine moiety is not sufficient to prevent ester formation, and one or more of the polymer precursors contain unsaturated carbon bonds, then the lignin hybrid thermoset resin will be a lignin polyester polyether polyamide hybrid thermoset resin.

If the polymer precursors do not contain ethers and the polymer precursors include alcohols, anhydrides, carboxylic acids, hydroxy acids, or a combination thereof, and aldehydes wherein the quantity of aldehyde moiety is sufficient to prevent ester formation, and one or more of the polymer precursors contain unsaturated carbon bonds, then the lignin hybrid thermoset resin will be a lignin polyacetal hybrid thermoset resin.

If the polymer precursors do not contain ethers and the polymer precursors include alcohols, anhydrides, carboxylic acids, hydroxy acids, or a combination thereof, and aldehydes wherein the quantity of aldehyde moiety is not sufficient to prevent ester formation, and one or more of the polymer precursors contain unsaturated carbon bonds, then the lignin hybrid thermoset resin will be a lignin polyester polyacetal hybrid thermoset resin.

If the polymer precursors contain ethers and the polymer precursors include alcohols, anhydrides, carboxylic acids, hydroxy acids, or a combination thereof, and aldehydes wherein the quantity of aldehyde moiety is not sufficient to prevent ester formation, and one or more of the polymer precursors contain unsaturated carbon bonds, then the lignin hybrid thermoset resin will be a lignin polyester polyether polyacetal hybrid thermoset resin.

If the polymer precursors do not contain ethers and the polymer precursors include alcohols, anhydrides, carboxylic acids, hydroxy acids, or a combination thereof; and an amine, amino acids, amino alcohols, or combination thereof wherein the quantity of amine moiety is not sufficient to prevent ester formation; and aldehydes; and one or more of the polymer precursors contain unsaturated carbon bonds; then the lignin hybrid thermoset resin will be a lignin polyester polyacetal polyamide hybrid thermoset resin.

If the polymer precursors contain ethers and the polymer precursors include alcohols, anhydrides, carboxylic acids, hydroxy acids, or a combination thereof; and an amine, amino acids, amino alcohols, or combination thereof wherein the quantity of amine moiety is not sufficient to prevent ester formation; and aldehydes; and one or more of the polymer precursors contain unsaturated carbon bonds; then the lignin hybrid thermoset resin will be a lignin polyester polyether polyacetal polyamide hybrid thermoset resin.

If the polymer precursors have short chains ($C_2$-$C_4$), and the polymer precursors include alcohols, aldehydes, amines, anhydrides, carboxylic acids, hydroxy acids, amino acids, amino alcohols, or a combination thereof, and one or more of the polymer precursors contain unsaturated carbon bonds, then the lignin hybrid thermoset resin will be a biodegradable lignin hybrid thermoset resin.

Lignin hybrid thermoset resins can be further modified with halogens, halocarbons, and additives. Halogenated lignin hybrid thermoset resins are another embodiment.

In some alternative embodiments, the principles of this disclosure may be applied to reactions of lignin with polyurea, phenol-formaldehyde, urea-formaldehyde, melamine, epoxy, epoxy-novolac, polyimides, and/or polycarbonates, for example.

EXAMPLES

Example 1: Lignin Polyester Polyol

In a suitable vessel, 400 parts by weight of BioChoice Lignin (BioChoice lignin is approximately 67% dry solids), 475 parts by weight of 1,3-propanediol (99.5% purity), and 295 parts by weight of adipic acid (99.5% purity) are added. The vessel is connected to a distillation apparatus. Then the vessel is heated 150° C., constantly stirred, under vacuum, and the vapors condensed and collected. The materials form a homogenous blend at approximately 45° C. Water visibly evolves at approximately 85° C. The temperature is maintained at 125° C. until the desired degree of polymerization is achieved. The desired degree of polymerization produces 109 parts by weight of water. The reaction is stopped when 278 parts by weight have been removed from the vessel by vacuum distillation. Most of the evaporated materials include excess water from BioChoice Lignin (132 parts by weight), water produced from the polymerization of lignin and polymer precursors (109 parts by weight), evaporated 1,3-propanediol (30 parts by weight), and various low-molecular-weight esters (4 parts by weight). Once the reaction is complete, a lignin polyester hybrid polyol is produced. The lignin polyol mass is 891 parts by weight. Once the lignin polyol is cool, it may be blended with additives and catalyst, and then the blend may be reacted with a crosslinker. The selection of additives, catalyst, and crosslinker and their respective properties determine whether a polyurethane coating, adhesive, sealant, elastomer, fiber, or binder is produced.

Example 2: Biodegradable Lignin Polyester Polyol

In a suitable vessel, 400 parts by weight of BioChoice Lignin (BioChoice lignin is approximately 67% dry solids), 475 parts by weight of ethylene glycol (99.5% purity), and 181 parts by weight of oxalic acid (99.5% purity) are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 109 parts by weight of water. The reaction is stopped when 287 parts by weight have been removed from the vessel by vacuum distillation. Most of the evaporated materials include excess water from BioChoice Lignin (132 parts by weight), water produced from the polymerization of lignin and polymer precursors (109 parts by weight), evaporated ethylene glycol (40 parts by weight), and various low-molecular-weight esters (4 parts by weight). Once the reaction is complete, a lignin polyester hybrid polyol is produced. The lignin polyol mass is 768 parts by weight. Once the lignin hybrid polyol is cool, it may be blended with additives and catalyst, and then the blend may be reacted with a crosslinker. The selection of additives, catalyst, and crosslinker and their respective properties will determine whether a polyurethane coating, adhesive, sealant, elastomer, fiber, or binder is produced.

Example 3: Purified Lignin Polyester Polyol

In a suitable vessel, 400 parts by weight of BioChoice Lignin (BioChoice lignin is approximately 67% dry solids) and 1670 parts by weight of 1,3-propanediol (99.5% purity) are added. The vessel is heated to 45° C. while being constantly stirred. The materials form a homogenous blend at approximately 45° C. The homogenous blend is passed through an ion-exchange resin which removes inorganic ion content. Then 285 parts by weight of adipic acid (99.5% purity) and the homogenous blend are added to a vessel. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 109 parts by weight of water. The reaction is stopped when 1473 parts by weight have been removed from the vessel by vacuum distillation. Most of the evaporated materials include excess water from BioChoice Lignin (132 parts by weight), water produced from the polymerization of lignin and polymer precursors (109 parts by weight), evaporated 1,3-propanediol (1219 parts by weight), and various low-molecular-weight esters (4 parts by weight). Once the reaction is complete, a lignin polyester hybrid polyol is produced. The lignin polyol mass is 891 parts by weight. Once the lignin polyol is cool, it may be blended with additives and catalyst, and then the blend may be reacted with a crosslinker. The selection of additives, catalyst, and crosslinker and their respective properties will determine whether a polyurethane coating, adhesive, sealant, elastomer, fiber, or binder is produced.

Example 4: Lignin Polyester Polyether Polyol

In a suitable vessel, 400 parts by weight of BioChoice Lignin (BioChoice lignin is approximately 67% dry solids), 545 parts by weight of diethylene glycol (99.5% purity), and 232 parts by weight of adipic acid (99.5% purity) are added. The HSP values of BioChoice Lignin are $\delta D$ 16.3, $\delta P$ 12.3, $\delta H$ 18.8. The HSP values of diethylene glycol are $\delta D$ 16.6, $\delta P$ 12.0, $\delta H$ 19.0. The HSP values of adipic acid are $\delta D$ 17.1, $\delta P$ 10.0, $\delta H$ 16.3. The HSP values of the unreacted blend of BioChoice lignin, diethylene glycol, and adipic acid are $\delta D$ 16.6, $\delta P$ 11.7, $\delta H$ 18.4. The vessel is connected to a distillation apparatus. Then the vessel is heated 160° C., constantly stirred, under vacuum, and the vapors are condensed and collected. The materials form a homogenous blend at approximately 45° C. Water visibly evolves at approximately 85° C. The temperature is maintained at 160° C. until the desired degree of polymerization is achieved. The desired degree of polymerization produces 85 parts by weight of water. The reaction is stopped when 255 parts by weight have been removed from the vessel by vacuum distillation. Most of the evaporated materials include excess water from BioChoice Lignin (132 parts by weight), water produced from the polymerization of lignin and polymer precursors (85 parts by weight), evaporated diethylene glycol (30 parts by weight), and various low-molecular-weight esters (4 parts by weight). Once the reaction is complete, a lignin polyester polyether hybrid polyol is produced. The lignin polyol mass is 922 parts by weight. The HSP values of the lignin hybrid polymer produced from the reaction of BioChoice lignin, diethylene glycol, and adipic acid are $\delta D$ 17.0, $\delta P$ 16.8, $\delta H$ 11.8. The HSP values were determined by assessing the compatibility of the lignin hybrid polymer to 15 known solvents, and calculating the HSP values using HSPiP software. Once the lignin polyol is cool, it may be blended with additives and catalyst, and then the blend may be reacted with a crosslinker. The selection of additives, catalyst, and crosslinker and their respective properties will determine whether a polyurethane coating, adhesive, sealant, elastomer, fiber, or binder is produced.

Example 5: Lignin Polyester Polyamide Polyol

In a suitable vessel, 400 parts by weight of BioChoice Lignin (BioChoice lignin is approximately 67% dry solids), 498 parts by weight of 1,3-propanediol (99.5% purity), 149 parts by weight of adipic acid (99.5% purity), and 119 parts by weight of hexamethylenediamine are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 119 parts by weight of water. The reaction is stopped when 298 by weight parts have been removed from the vessel by vacuum distillation. Most of the evaporated materials include excess water from BioChoice Lignin (132 parts by weight), water produced from the polymerization of lignin and polymer precursors (119 parts by weight), evaporated 1,3-propanediol (40 parts by weight), and various low-molecular-weight esters (4 parts weight). Once the reaction is complete, a lignin polyester hybrid polyol is produced. The lignin polyol mass is 867 parts by weight. Once the lignin polyol is cool, it may be blended with additives and catalyst, and then the blend may be reacted with a crosslinker. The selection of additives, catalyst, and crosslinker and their respective properties will determine whether a polyurethane coating, adhesive, sealant, elastomer, fiber, or binder is produced.

Example 6: Lignin Polyester Thermoplastic

In a suitable vessel, 998 parts by weight of BioChoice Lignin (BioChoice lignin is approximately 67% dry solids), 171 parts by weight of 1,3-propanediol (99.5% purity), and 102 parts by weight of adipic acid (99.5% purity) are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 63 parts by weight of water. The reaction is stopped when 418 parts by weight have been removed from the vessel by vacuum distillation. Most of the evaporated materials include excess water from BioChoice Lignin (329 parts by weight), water produced from the polymerization of lignin and polymer precursors (63 parts by weight), evaporated 1,3-propanediol (20 parts by weight), and various low-molecular-weight esters (4 parts by weight). Once the reaction is complete, a lignin polyester thermoplastic is produced. The lignin thermoplastic mass is 853 parts by weight. The lignin thermoplastic may be further modified with additives to improve its properties.

Example 7: Biodegradable Lignin Polyester Thermoplastic

In a suitable vessel, 998 parts by weight of BioChoice Lignin (BioChoice lignin is approximately 67% dry solids), 190 parts by weight of ethylene glycol (99.5% purity), and 86 parts by weight of oxalic acid (99.5% purity) are added. The vessel is connected to a distillation apparatus. Then the vessel is heated 125° C., constantly stirred, under vacuum, and the vapors are condensed and collected. The materials form a homogenous blend at approximately 65° C. Water visibly evolves at approximately 85° C. The temperature is maintained at 125° C. until the desired degree of polymerization is achieved. The desired degree of polymerization produces 77 parts by weight of water. The reaction is stopped when 434 parts by weight have been removed from the vessel by vacuum distillation. Most of the evaporated materials include excess water from BioChoice Lignin (329 parts by weight), water produced from the polymerization of lignin and polymer precursors (77 parts by weight), evaporated ethylene glycol (24 parts by weight), and various low-molecular-weight esters (2 parts by weight). Once the reaction is complete, a biodegradable lignin polyester thermoplastic is produced. The lignin thermoplastic mass is 840 parts by weight. The biodegradable lignin polyester thermoplastic may be further modified with additives to improve its properties.

Example 8: Lignin Polyester Polyether Thermoplastic

In a suitable vessel, 998 by weight parts of BioChoice Lignin (BioChoice lignin is approximately 67% dry solids), 193 parts of diethylene glycol by weight (99.5% purity), and 83 parts by weight of adipic acid (99.5% purity) are added. The vessel is connected to a distillation apparatus. Then the vessel is heated 125° C., constantly stirred, under vacuum, and the vapors are condensed and collected. The materials form a homogenous blend at approximately 65° C. Water visibly evolves at approximately 85° C. The temperature is maintained at 125° C. until the desired degree of polymerization is achieved. The desired degree of polymerization produces 56 parts by weight of water. The reaction is stopped when 412 by weight parts have been removed from the vessel by vacuum distillation. Most of the evaporated materials include excess water from BioChoice Lignin (329 parts by weight), water produced from the polymerization of lignin and polymer precursors (56 parts by weight), evaporated diethylene glycol (24 parts by weight), and various low-molecular-weight esters (2 parts by weight). Once the reaction is complete, a biodegradable lignin polyester thermoplastic is produced. The lignin thermoplastic mass is 861 parts by weight. The lignin polyester polyether thermoplastic may be further modified with additives to improve its properties.

Example 9: Lignin Polyester Polyamide Thermoplastic

In a suitable vessel, 998 parts by weight of BioChoice Lignin (BioChoice lignin is approximately 67% dry solids), 193 parts by weight of 1,3-propanediol (99.5% purity), 53 parts of adipic acid (99.5% purity), and 42 parts by weight of hexamethylenediamine (99.5% purity) are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 45 parts by weight of water. The reaction is stopped when 403 parts by weight have been removed from the vessel by vacuum distillation. Most of the evaporated materials include excess water from BioChoice Lignin (329 parts by weight), water produced from the polymerization of lignin and polymer precursors (45 parts by weight), evaporated 1,3-propanediol (25 parts by weight), and various low-molecular-weight esters (2 parts). Once the reaction is complete, a lignin polyester polyamide hybrid is produced. The lignin thermoplastic mass is 883 parts by weight. The lignin thermoplastic may be further modified with additives to improve its properties.

Example 10: Lignin Polyester Thermoset

In a suitable vessel, 998 parts by weight of BioChoice Lignin (BioChoice lignin is approximately 67% dry solids), 197 parts by weight of 1,3-propanediol (99.5% purity), and 79 parts by weight maleic anhydride (99.5% purity) are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the desired degree of polymerization is achieved. The desired degree of polymerization produces 69 parts by weight of water. The reaction is stopped when 427 by weight parts have been removed from the vessel by vacuum distillation. Most of the evaporated materials include excess water from BioChoice Lignin (329 parts by weight), water produced from the polymerization of lignin and polymer precursors (69 parts by weight), evaporated 1,3-propanediol (25 parts by weight), and various low-molecular-weight esters (2 parts by weight). Once the reaction is complete, a lignin polyester hybrid polyol is produced. The lignin thermoset mass is 847 parts by weight. Once the lignin thermoset resin is cooled, it may be blended with additives and catalyst, and then the blend may be reacted with a crosslinker.

Example 11: Lignin Polyester Polyol Using Multiple Diols and Dicarboxylic Acids

In a suitable vessel, 400 parts by weight of BioChoice Lignin (BioChoice lignin is approximately 67% dry solids) and 375 parts by weight of 1,3-propanediol (99.5% purity) are added. The vessel is connected to a distillation apparatus. Then the vessel is heated 125° C., constantly stirred, under vacuum, and the vapors are condensed and collected. The materials form a homogenous blend at approximately 45° C. Water visibly evolves at approximately 85° C. The temperature is maintained at 125° C. until the water is removed and the desired degree of polymerization is achieved. The desired degree of polymerization produces 11 parts by weight of water. The reaction is stopped when 155 parts by weight have been removed from the vessel by vacuum distillation. Most of the evaporated materials include excess water from BioChoice Lignin (132 parts by weight), water produced from the polymerization of lignin and polymer precursors (11 parts by weight), evaporated 1,3-propanediol (10 parts by weight), and various low-molecular-weight esters (1 parts by weight). Once the reaction is complete, additional materials are added. 100 parts by weight of propylene glycol, 215 parts by weight of adipic acid, and 80 parts by weight of oxalic acid are added. The temperature is maintained at 125° C. until the water is removed and the desired degree of polymerization is achieved. The desired degree of polymerization produces 143 parts by weight of water. The reaction is stopped when 160 parts by weight have been removed from the vessel by vacuum distillation. Most of the evaporated materials include water produced from the polymerization of lignin and polymer precursors (143 parts by weight), evaporated 1,3-propanediol and propylene glycol (15 parts by weight), and various low-molecular-weight esters (1 part by weight). Once the reaction is complete, a lignin polyester hybrid polyol is produced. The lignin polyol mass is 853 parts by weight. Once the lignin polyol is cooled, it may be blended with additives and catalyst, and then the blend may be reacted with a crosslinker. The selection of additives, catalyst, and crosslinker and their respective properties will determine whether a polyurethane coating, adhesive, sealant, elastomer, fiber, or binder is produced.

In this detailed description, reference has been made to multiple embodiments in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein. This specification hereby incorporates by reference U.S. Pat. No. 9,593,221, issued on Mar. 14, 2017.

The embodiments and variations described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A composition comprising from about 1 wt % to about 99 wt % of lignin and from about 1 wt % to about 99 wt % of a lignin-compatible blend of at least two distinct polymer precursors, wherein at least one of said polymer precursors has a chemical bond with said lignin, wherein said polymer precursors are selected from the group consisting of alcohols, carboxylic acids, and combinations thereof, and wherein said carboxylic acids are selected from the group consisting of acetic acid, propanoic acid, butanoic acid, hexanoic acid, oleic acid, linoleic acid, nonanoic acid, undecanoic acid, lauric acid, isononanoic acid, adipic acid, azelaic acid, sebacic acid, succinic acid, glutaric acid, decanoic diacid, dodecanoic diacid, citric acid, aconitic acid, isocitric acid, sorbic acid, and combinations of thereof.

2. The composition of claim 1, wherein said composition consists essentially of said lignin and said lignin-compatible blend of at least two distinct polymer precursors.

3. The composition of claim 1, wherein said lignin is derived from fractionating lignocellulosic biomass.

4. The composition of claim 1, wherein said chemical bond is selected from the group consisting of ester, ether, amide, imide, acetal, ketal, urethane, carbamate, and combinations thereof.

5. The composition of claim 1, wherein said lignin-compatible blend of polymer precursors forms a single phase with said lignin.

6. The composition of claim 1, wherein said lignin-compatible blend of polymer precursors and lignin are compatible based on analysis using Hansen's Solubility Parameters.

7. The composition of claim 6, wherein said lignin is individually compatible with said polymer precursor with a chemical bond with said lignin, based on analysis using Hansen's Solubility Parameters.

8. The composition of claim 6, wherein said lignin is individually compatible with all polymer precursors present in said composition, based on analysis using Hansen's Solubility Parameters.

9. The composition of claim 6, wherein said polymer precursors are compatible with each other, based on analysis using Hansen's Solubility Parameters.

10. The composition of claim 1, wherein said alcohols are selected from the group consisting of methanol, ethanol, propanol, and isopropanol, allyl alcohol, geraniol, and propargyl alcohol, 1,2-ethandiol, 1,2-propandiol, 1,3-propandiol, 1,4-butandiol, 1,5-pentandiol, 1,6-hexandiol, 1, 7-heptandiol, 1,8-octandiol, 1,9-nonandiol, 1,10-decandiol, 1,11-undecandiol, 1,12-dodecandiol, 1,13-tridecandiol, 2-methyl-1,3-propanediol, 2,2,4,4-tetramethyl-1,3-cyclobutanediol, 2,2,4,4-tetramethyl-1,3-cyclobutanediol, 3-methyl-1,5- pentanediol, 1,3-cyclohexanediyldimethanol, cyclohexanedimethanol, ethylene glycol, propylene glycol, 1,2-butylene glycol, 1,3-butylene glycol, neopentyl glycol, propylene glycol, dipropylene glycol, tripropylene glycol, triethylene glycol, tetraethylene glycol, phenol, bisphenol A, ethoxylates, glycerol, pentaerythritol, sorbitol, trimethylolpropane, and combinations thereof.

11. A composition in claim 1, where said polymer precursors are not polymerized before forming chemical bonds with lignin.

12. The composition of claim 4, wherein said chemical bond is formed during a single reaction step at a temperature between 50° C. and 125° C.

13. The composition of claim 4, wherein said chemical bond is formed without the aid of a catalyst.

* * * * *